US011878607B2

(12) United States Patent
Gregor et al.

(10) Patent No.: US 11,878,607 B2
(45) Date of Patent: Jan. 23, 2024

(54) LONGITUDINAL ADJUSTER FOR A VEHICLE SEAT, AND VEHICLE SEAT

(71) Applicant: Adient US LLC, Plymouth, MI (US)

(72) Inventors: Peter Gregor, Trencianski Stankovce (SK); Thorsten Schuermann, Odenthal (DE); Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/754,372

(22) PCT Filed: Oct. 2, 2020

(86) PCT No.: PCT/EP2020/077671
§ 371 (c)(1),
(2) Date: Mar. 31, 2022

(87) PCT Pub. No.: WO2021/064181
PCT Pub. Date: Apr. 8, 2021

(65) Prior Publication Data
US 2022/0332221 A1   Oct. 20, 2022

(30) Foreign Application Priority Data

Oct. 2, 2019 (DE) .................... 10 2019 126 661.0
Feb. 5, 2020 (DE) .................... 10 2020 102 867.9

(51) Int. Cl.
*B60N 2/06* (2006.01)

(52) U.S. Cl.
CPC .................................. *B60N 2/067* (2013.01)

(58) Field of Classification Search
CPC .......... B60N 2/067; B60N 2/06; B60N 2/062; B60N 2/065
(Continued)

(56) References Cited

U.S. PATENT DOCUMENTS 8,820,694 B2 *   9/2014   Tarusawa ............... B60N 2/067
                                                        296/65.13
2004/0012236 A1 *  1/2004   Mallard ................. B60N 2/067
                                                        297/344.1
(Continued)

FOREIGN PATENT DOCUMENTS

DE        10358586 A1    7/2005
DE     102006022947 B3    9/2007
(Continued)

OTHER PUBLICATIONS

European Patent Office, International Search Report and Written Opinion in Application No. PCT/EP2020/077671, dated Dec. 16, 2020, 11 pages, Rijswijk Netherlands.

*Primary Examiner* — Mark R Wendell
(74) *Attorney, Agent, or Firm* — Marshall & Melhorn, LLC (57) ABSTRACT

A longitudinal adjuster for a motor vehicle seat may have a first rail, a second rail, a spindle, and a gear. The gear may be fastened to the second rail by a substantially U-shaped gear holder, and the gear holder may have at least two limbs arranged opposite one another in the longitudinal direction. The gear holder may have at least one recess in a base connecting the two limbs, and a gear housing surrounding the gear projects at least in sections into the at least one recess. A motor vehicle seat may have the longitudinal adjuster for adjusting a seat longitudinal position.

15 Claims, 6 Drawing Sheets

(58) Field of Classification Search
USPC .................................................. 297/344.1
See application file for complete search history.

(56) References Cited

U.S. PATENT DOCUMENTS

| | | | |
|---|---|---|---|
| 2008/0105810 A1 | 5/2008 | Hofschulte et al. | |
| 2008/0163708 A1 | 7/2008 | Porinsky et al. | |
| 2008/0282822 A1* | 11/2008 | Birker | F16H 57/039 74/89.39 |
| 2010/0320352 A1* | 12/2010 | Weber | B60N 2/067 74/89.23 |
| 2014/0339392 A1 | 11/2014 | Enokijima et al. | |
| 2015/0367752 A1* | 12/2015 | Chang | F16H 25/2003 74/89.42 |
| 2019/0100118 A1 | 4/2019 | Rey | |
| 2019/0143847 A1 | 5/2019 | Taniguchi et al. | |

FOREIGN PATENT DOCUMENTS

| | | |
|---|---|---|
| DE | 102006052936 A1 | 5/2008 |
| DE | 202011110092 U1 | 11/2012 |
| EP | 1930204 A2 | 6/2008 |
| WO | 2019030369 A1 | 2/2019 |
| WO | 2019156292 A1 | 8/2019 |

* cited by examiner

PRIOR ART

LONGITUDINAL ADJUSTER FOR A VEHICLE SEAT, AND VEHICLE SEAT

FIELD

The invention relates to a longitudinal adjuster for a vehicle seat, in particular motor vehicle seat, having a first rail, a second rail which is guided displaceably in a longitudinal direction in the first rail, a spindle which is arranged between the first rail and the second rail, and a drivable gear, wherein the gear is in engagement with a thread of the spindle and is movable along the spindle, or the gear is arranged in a fixed position relative to the spindle and the spindle is drivable by the gear, wherein the gear is fastened to the second rail by a substantially U-shaped gear holder, and the gear holder has at least two limbs which are arranged opposite one another in the longitudinal direction, wherein the gear holder has at least one recess in a base connecting the two limbs and running horizontally, and to a vehicle seat.

BACKGROUND

US 2008/0163708 A1 discloses a longitudinal adjuster for a vehicle seat, having a first rail, a second rail which is guided displaceably in a longitudinal direction in the first rail, a spindle which is fixed relative to the first rail, and a drivable gear which is in engagement with a thread of the spindle and is movable along the spindle, wherein the gear is fastened to the second rail by a substantially U-shaped gear holder, and the gear holder has at least two limbs which are arranged opposite one another in the longitudinal direction, wherein the gear holder has at least one recess in a base connecting the two limbs and running horizontally.

WO 2019/030369 A1 discloses a longitudinal adjuster in which a gear is arranged in a gear housing and is coupled to a seat rail of the longitudinal adjuster.

SUMMARY

The invention is based on the problem of providing a longitudinal adjuster for a vehicle seat, said longitudinal adjuster being improved in relation to the prior art, and an improved vehicle seat. In particular, a longitudinal adjuster with improved tolerance compensation is created.

This problem is solved according to the invention by a longitudinal adjuster for a vehicle seat, in particular motor vehicle seat, having a first rail, a second rail which is guided displaceably in a longitudinal direction in the first rail, a spindle which is arranged between the first rail and the second rail, and a drivable gear, wherein the gear is in engagement with a thread of the spindle and is movable along the spindle, or the gear is arranged in a fixed position relative to the spindle and the spindle is drivable by the gear, wherein the gear is fastened to the second rail by a substantially U-shaped gear holder, and the gear holder has at least two limbs which are arranged opposite one another in the longitudinal direction, wherein the gear holder has at least one recess in a base connecting the two limbs and running horizontally, wherein a gear housing surrounding the gear projects at least in sections into the at least one recess.

Owing to the fact that the gear holder has at least one recess in a base connecting the two limbs and run substantially horizontally, and a gear housing surrounding the gear projects at least in sections into the at least one recess, it is made possible to use the additional free construction space defined by the recess for the gear housing and/or for tolerance compensation.

Advantageous refinements which can be used individually or in combination with one another are the subject matter of the dependent claims.

According to a first variant of the longitudinal adjuster, in particular with a fixed spindle, the gear can be in engagement with a thread of the spindle and can be movable along the spindle. The spindle can be held here fixedly in terms of rotation relative to the first rail by at least one spindle holder, preferably two spindle holders. The gear can have a worm which is drivable by a motor. On the output side, the transmission can have a worm wheel which is drivable by the worm and interacts with the spindle. The gear of the longitudinal adjuster can be arranged in a central region of the second rail in the direction of longitudinal extent. The worm wheel can have an internal thread which interacts with an external thread of the spindle. In order to produce a relative movement of the first rail relative to the second rail, it can be provided, according to the first variant of the longitudinal adjuster, that the gear, which is held for example on the second rail, is movable along the spindle which is fixed for example to the first rail.

According to a second variant of the longitudinal adjuster, in particular with a rotatably drivable spindle, the gear can be arranged in a fixed position relative to the spindle, and the spindle can be drivable by the gear. In this case, the spindle can be mounted, in the region of one end of the spindle, in the gear. The spindle can be mounted in the region of an end remote from the gear by a rotary bearing. The gear can have a worm which is drivable by a motor. On the output side, the gear can have a worm wheel which is drivable by the worm and interacts with the spindle. The gear of the longitudinal adjuster can be arranged in a region of a front or rear end of the second rail. The longitudinal adjuster can have a spindle nut having an internal thread. The spindle nut can be fixed to the first rail. The spindle nut can interact by its internal thread with an external thread of the spindle. The spindle is arranged here in a fixed position relative to the gear and is drivable by the gear.

In order to produce a relative movement of the first rail relative to the second rail, it can be provided, according to the second variant of the longitudinal adjuster, that a spindle nut, which is fixed for example to the first rail, is movable along the spindle which is mounted, for example, relative to the second rail and is drivable by the gear.

Irrespective of the exemplary embodiments described explicitly below, the described gear holders and gears are usable in a longitudinal adjuster according to the first or second variant and are therefore expressly incorporated by the invention.

The recess can be delimited in its edge regions by vertically running wall portions. The recess can be delimited exclusively by vertically running wall portions. The gear housing can enter the recess of the base as far as a region with vertical wall portions. The gear housing can pass through the base as far as a lower edge of the recess. In the vertical direction above the outer regions of the base, a gap can be provided between the base and the gear housing or between the base and optionally provided buffers. The gap can serve for tolerance compensation.

The limbs can each have a portion in the region of the at least one recess. The portions can be punched free. The portions can have a rectilinear profile relative to the respective limb. The portions can be at an angle of 90° relative to the base. By this means, the recess is not reduced in size by a bending radius in the transition region between a limb and the base in each case in such a manner that the bending radius delimits or influences reception of the gear housing surrounding the gear in the at least one recess.

The gear housing can have two housing parts. The two housing parts can be fixable to each other perpendicularly to the axial direction of the spindle.

Two buffers can be plugged onto the gear housing in parallel to the axial direction of the spindle, in particular in order to reduce contact noises with the gear holder that occur during a load change. The buffers can be manufactured from rubber. The buffers can each project in sections into the at least one recess. In the case of two recesses, in each case one buffer can project in sections into in each case one of the recesses. Within the meaning of the present invention, the buffers which are optionally provided are not considered to be part of the gear housing.

The gear holder can have two recesses in the base. The two recesses can be separated from each other by a web. The web can run inclined at a right angle with respect to an axis of rotation of the spindle.

Alternatively, the gear holder can have precisely one recess in the base and the base can be divided by the recess into two bridge portions running parallel. The recess can be delimited in the transverse direction by the two bridge portions of the base.

The recess can be delimited parallel to the longitudinal direction. The base can have two bridge portions running in parallel, in particular bridge portions oriented parallel to the longitudinal direction. The at least one recess can be delimited in the transverse direction by the two bridge portions of the base.

The base can have a respective bevel on its lateral outer edges, as viewed in the longitudinal direction. The bridge portions of the base can each have a bevel on the lateral outer edges thereof, as viewed in the longitudinal direction.

Furthermore, it can be provided that in each case a fastening portion protruding substantially vertically protrudes from the two limbs. The gear holder can be connectable, in particular rivetable, to the second rail by the two fastening portions. For the fastening of the gear holder to the second rail, the fastening portions can be guidable through cooperating openings in the second rail and can be rivetable by deformation on a side of the second rail opposite the gear housing. The two limbs of the gear holder can have lateral protrusions which can be accommodated in corresponding recesses in vertically running wall portions of the second rail.

The problem on which the invention is based is furthermore solved by a vehicle seat, in particular motor vehicle seat, wherein the vehicle seat has a longitudinal adjuster according to the above description for adjusting a seat longitudinal position.

DESCRIPTION OF THE FIGURES

The invention is explained in more detail below with reference to advantageous exemplary embodiments which are illustrated in the figures. However, the invention is not limited to said exemplary embodiments. In the figures.

DETAILED DESCRIPTION

Figure 1:
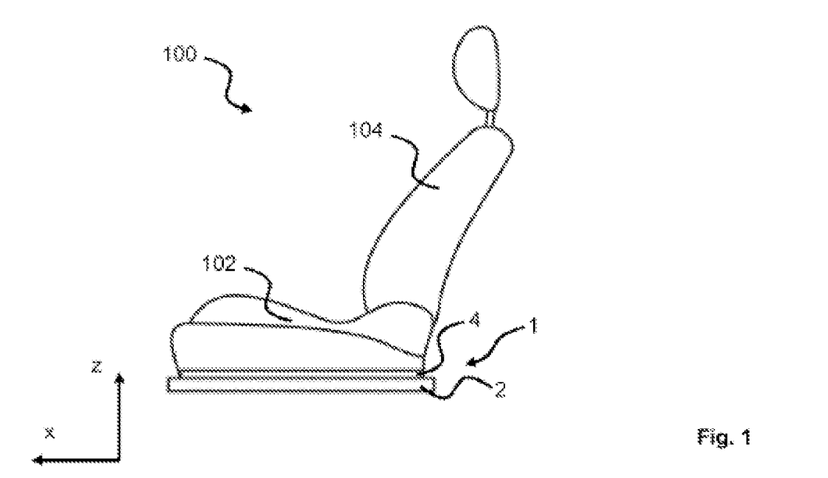
FIG. 1 shows schematically a vehicle seat according to the invention.

The vehicle seat 100 illustrated schematically in FIG. 1 is described below using three spatial directions running perpendicular to one another. In the case of a vehicle seat 100 installed in the vehicle, a longitudinal direction x runs substantially horizontally and preferably parallel to a vehicle longitudinal direction, which corresponds to the normal direction of travel of the vehicle. A transverse direction y, which runs perpendicularly with respect to the longitudinal direction x, is likewise oriented horizontally in the vehicle and runs parallel to a vehicle transverse direction. A vertical direction z runs perpendicularly to the longitudinal direction x and perpendicularly to the transverse direction y. In the case of a vehicle seat 100 installed in the vehicle, the vertical direction z runs parallel to the vertical axis of the vehicle.

The positional and directional indications used, such as for example front, rear, top and bottom, relate to a viewing direction of an occupant sitting in the vehicle seat 100 in a normal sitting position, wherein the vehicle seat 100 is installed in the vehicle, in a use position suitable for passenger transport, with an upright backrest 104, and is oriented in the conventional manner in the direction of travel. The vehicle seat 100 according to the invention may however also be installed in a different orientation, for example transversely with respect to the direction of travel.

The vehicle seat 100 for a motor vehicle has a seat part 102 and the backrest 104 which is adjustable in its inclination relative to the seat part 102. In order to adjust a seat longitudinal position of the vehicle seat 100, the vehicle seat 100 is connected to a longitudinal adjuster 1, wherein the longitudinal adjuster 1 is connectable to a vehicle structure.

The longitudinal adjuster 1 of the vehicle seat 100 in a motor vehicle serves for the motorized longitudinal adjustment, i.e. the adjustment of the seat longitudinal position, of the vehicle seat 100. On each side of the vehicle seat, the longitudinal adjuster 1 has a first rail 2 to be connected to the vehicle structure and a second rail 4 which is connected to the further seat structure of the vehicle seat 100. On each side of the vehicle seat, the two rails 2, 4 engage mutually around each other forming a rail profile and are movable relative to each other in the longitudinal direction x.

Figure 2:
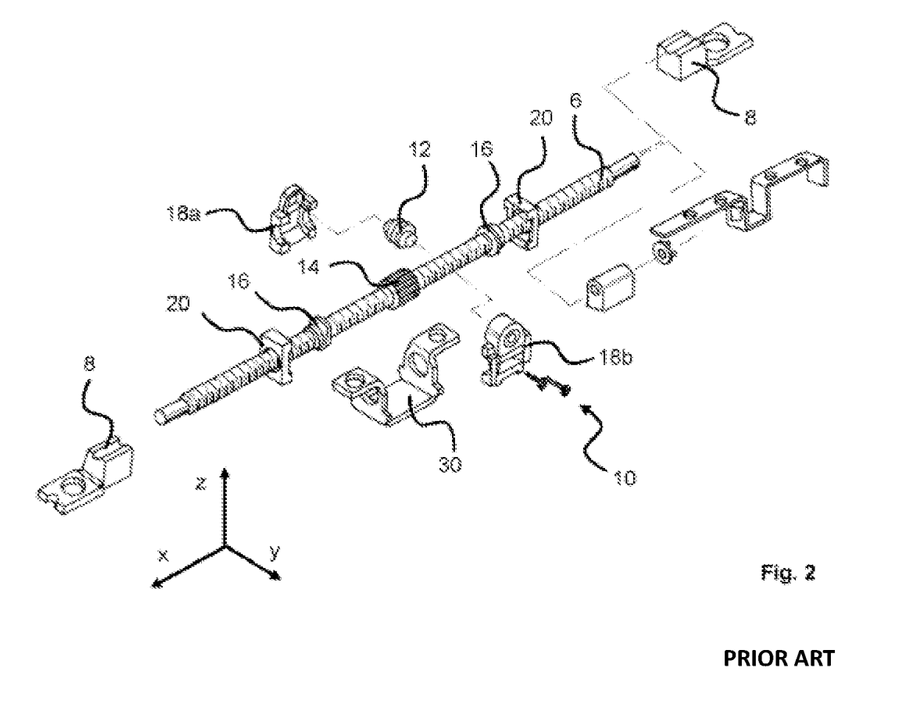
FIG. 2 shows schematically an exploded illustration of a prior art longitudinal adjuster of the type in question.
Figure 3:
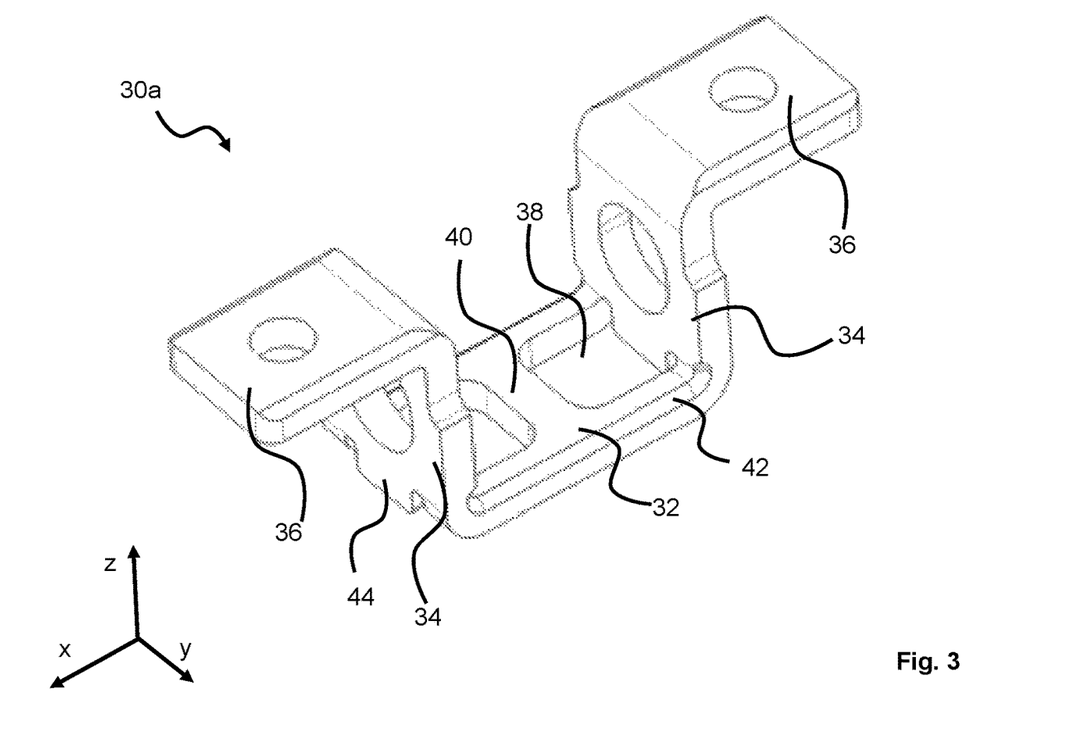
FIG. 3 shows a perspective illustration of a gear holder according to a first exemplary embodiment of a longitudinal adjuster according to the invention.
Figure 4:
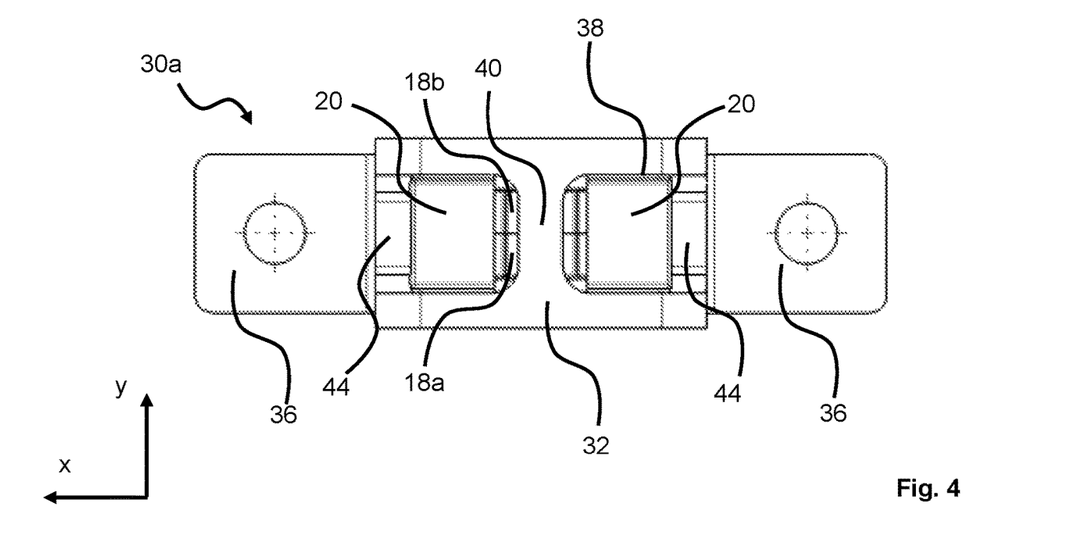
FIG. 4 shows a view from below of the gear holder from FIG. 3 and a gear arranged in the gear holder.
Figure 5:
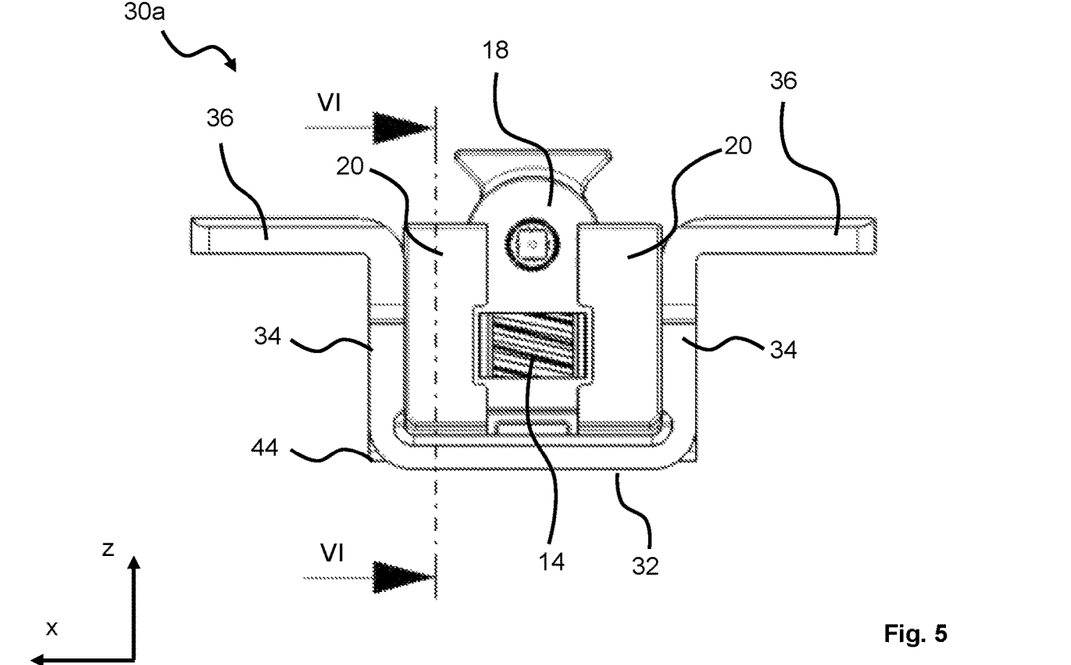
FIG. 5 shows a side view of the gear holder from FIG. 3 and the gear arranged in the gear holder.
Figure 6:
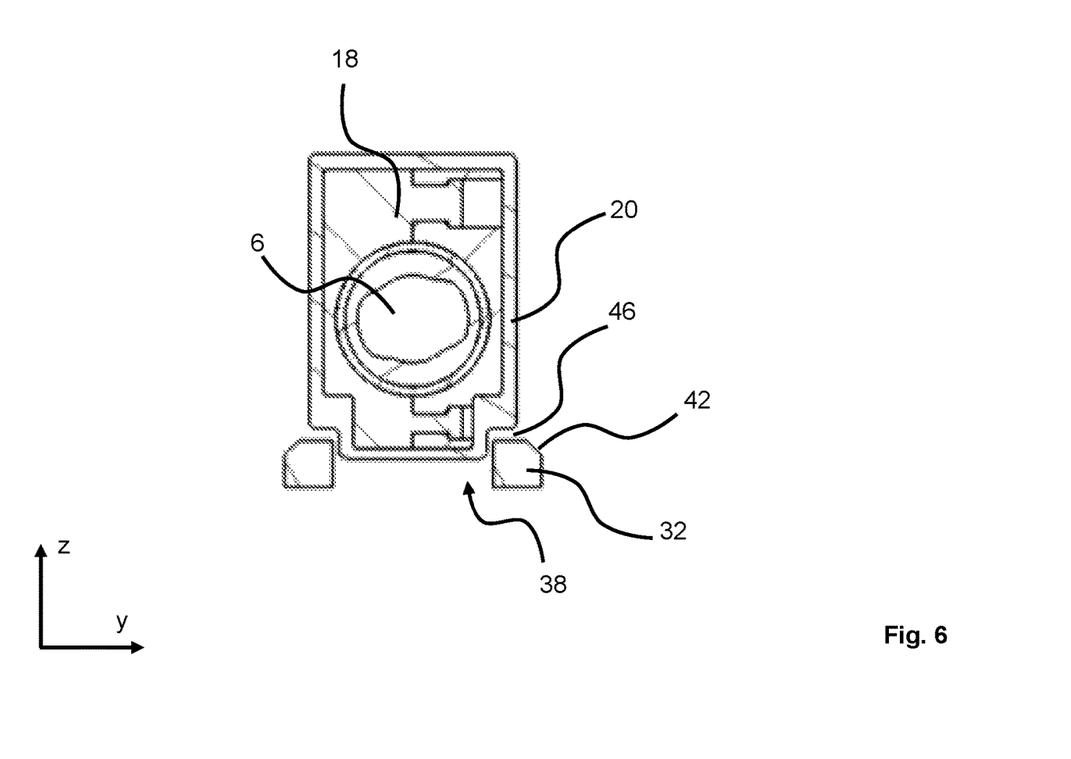
FIG. 6 shows a sectional illustration along the sectional plane Vi-VI in FIG. 5.
Figure 7:
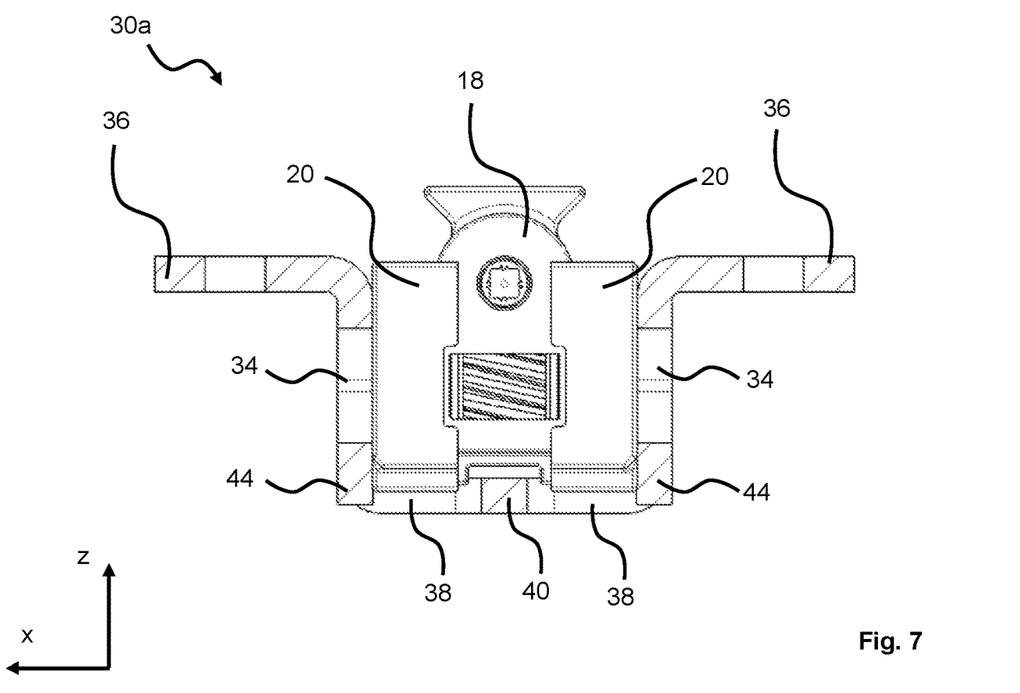
FIG. 7 shows a side view corresponding to FIG. 5 with a gear holder illustrated in cut-open form.

FIG. 2 shows an exploded illustration of a longitudinal adjuster 1 of the type in question. For driving the relative movement of the two rails 2, 4, a gear 10 is provided which is arranged at least substantially within the rail profile. The longitudinal adjuster 1 has a spindle 6 which is arranged parallel to the longitudinal direction x and is held in a manner fixed relative to the first rail 2 by spindle holders 8. The gear 10 has a spindle nut 14, a worm 12 which is in geared connection with the spindle nut 14, a two-part gear housing 18, two bearing bushings 16 and two buffers 20. The gear 10 is movable along the spindle 6 by the spindle nut 14. The operating principle, which is known per se, of the gear 10 is described in DE 103 58 586 A1, the disclosure of which in this regard is expressly incorporated.

The spindle nut 14 has an internal thread by which it is screwed onto the spindle 6, which has an external thread. The spindle nut 14 furthermore has an external toothing in which the worm 12, which is arranged perpendicular to the spindle 6, engages. One of the bearing bushings 16 is arranged in each case upstream and downstream of the spindle nut 14 in the longitudinal direction x, optionally with the interposition of a damping ring. The two housing parts 18a, 18b are connected, for example screwed, to each other with the formation of the gear housing 18. The gear housing 18 receives the worm 12, the spindle nut 14, optionally the damping rings and, at least in part, the bearing bushings 16. The gear housing 18 mounts the worm 12 rotatably about an axis of rotation perpendicular to the spindle 6, optionally with the interposition of further bearing bushings.

The gear housing 18 is mounted in the gear holder 30 upstream and downstream of the gear housing 18 in the longitudinal direction x with the interposition of the buffers 20. The gear holder 30 has approximately a U-shape with angled end portions. The bearing bushings 16 support the gear housing both in the gear holder 30 and also relative to the spindle 6. The gear holder 30 is connected, for example screwed, fixedly to the second rail 4. The worm 12 protrudes out of the gear housing 18 by a shaft stub which serves for the connection of a driving motor. Said motor, not illustrated specifically, for driving the gear 10 is mounted on the second rail 4 or, in particular if a common motor is provided for both sides of the vehicle seat, is preferably arranged on a transverse connection between the two second rails 4.

A gear holder 30a of the longitudinal adjuster 1 according to the invention according to a first exemplary embodiment substantially corresponds to the gear holder 30 shown in FIG. 2 unless described differently below. The gear holder 30a is shown in FIGS. 3 to 7.

The gear holder 30a is of substantially U-shaped configuration. The gear holder 30a has two limbs 34 arranged opposite each other in the longitudinal direction x. A fastening limb 36 which runs substantially horizontally protrudes in each case from the two limbs 34. The gear holder 30a is connectable, in particular screwable, to the second rail 4 with the two fastening limbs 36. The two limbs 34 of the gear holder 30a are connected to each other by a base 32 running substantially horizontally.

The base 32 has at least one recess 38, in the present case two recesses 38. The two recesses 38 are separated from each other by a web 40 oriented in the transverse direction y.

The base 32 has a bevel 42 on its lateral edges, as viewed in the longitudinal direction x. The gear holder 30a can have a reduced thickness in the region of the base 32.

The gear holder 30a can be manufactured as a punched and bent part from a metal sheet, in particular a steel sheet. The two limbs 34 are thus bent at the two ends upward by approximately 90° in relation to the base 32. The two fastening limbs 36 are bent over away from each other by approximately 90° at the ends of the limbs 34 in each case lying opposite the base 32. In the region of the recesses 38, the limbs 34 each have a portion 44 which is punched free and is not bent during the introduction of the bend between base 32 and the respective limb 34, but rather retains its rectilinear profile relative to the limb 34. After the bend of the limb 34, the portion 44 has a vertical profile. The portion 44 is accordingly not bent, but rather merely pivoted by approx. 90°. In the present case, the base 32 has an H shape, wherein in each case two of the ends oriented in parallel of the H shape merge into the vertically running limbs 34.

The gear housing 18 can have, in a central region, a cutout in which the web 40 can be accommodated in the mounted state. The gear housing 18 can have a shape adapted to the H shape of the base 32 such that the gear housing 18 enters into the recesses 38 of the base 32. In the vertical direction z above the outer regions of the base 32 in the transverse direction y, a gap 46 which serves for tolerance compensation can be provided between the base 32 and the gear housing 18 or the buffers 20.

Figure 8:
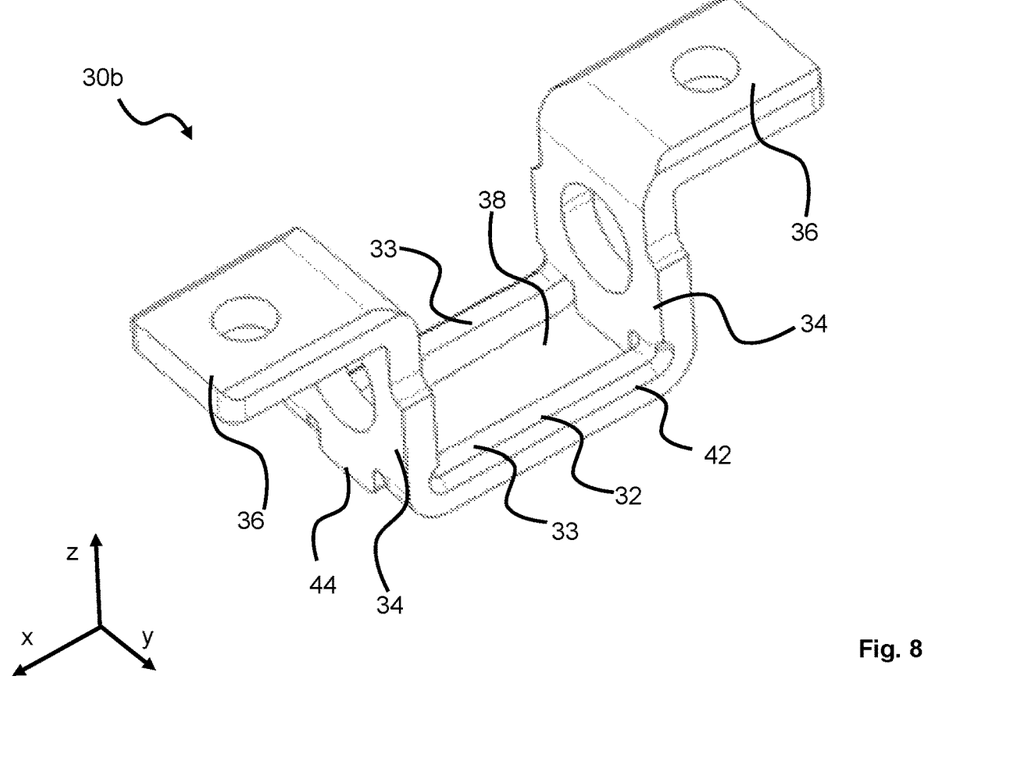
FIG. 8 shows a perspective illustration of a gear holder according to a second exemplary embodiment of a longitudinal adjuster according to the invention.
Figure 9:
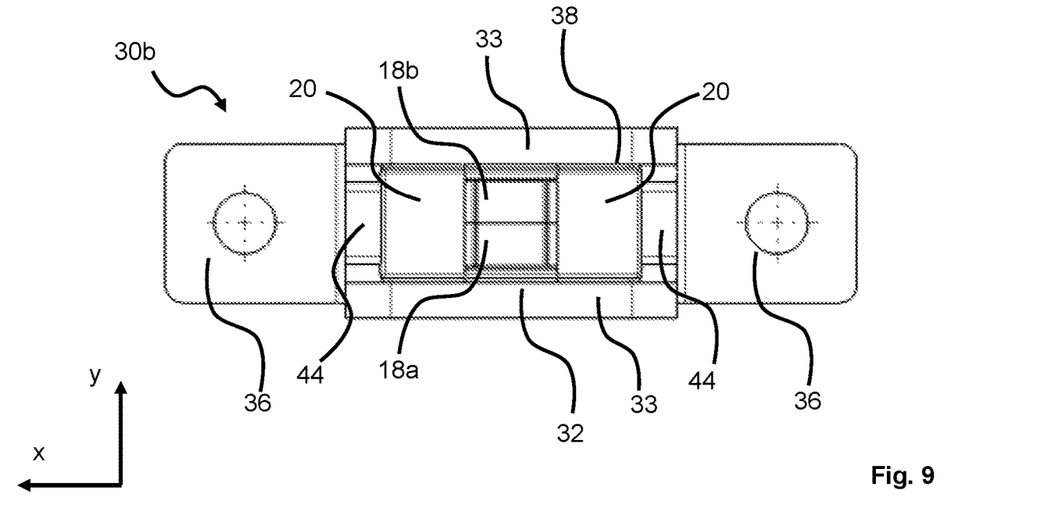
FIG. 9 shows a view from below of the gear holder from FIG. 8 and a gear arranged in the gear holder.
Figure 10:
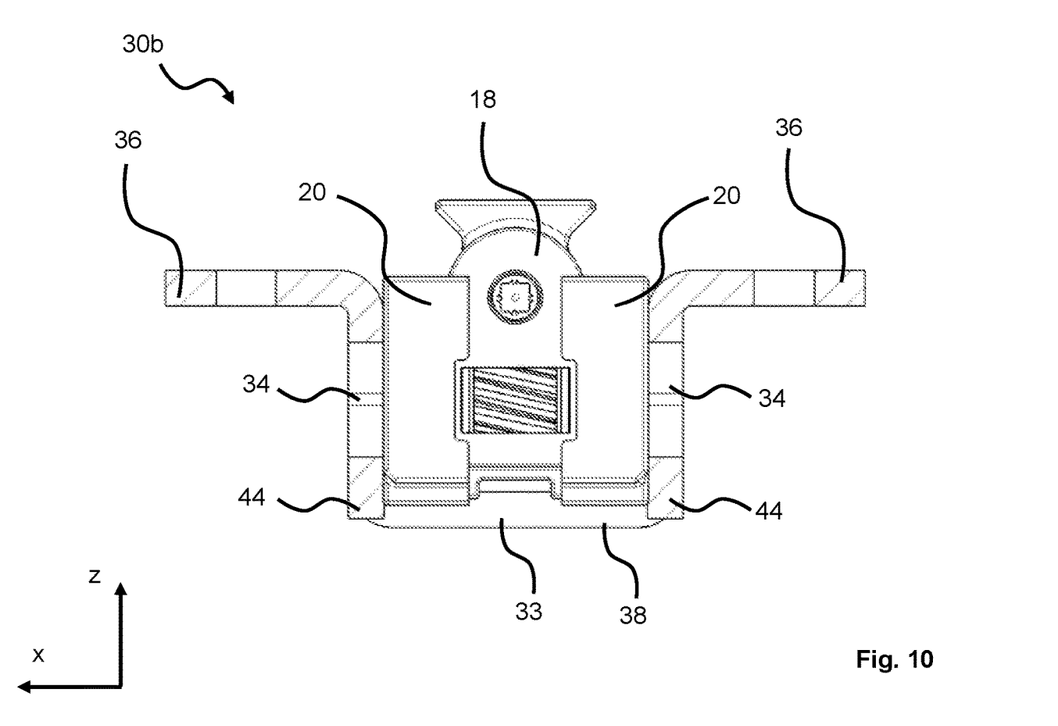
FIG. 10 shows a side view with the gear holder from FIG. 8 illustrated in cut-open form.

FIGS. 8 to 10 show various illustrations of a gear holder 30b of a longitudinal adjuster 1 according to the invention according to a second exemplary embodiment. The gear holder 30b of the longitudinal adjuster 1 according to the invention according to the second exemplary embodiment corresponds substantially to the gear holder 30a, shown in FIGS. 3 to 7, according to the first exemplary embodiment, unless described differently below.

The gear holder 30b is of substantially U-shaped configuration. The gear holder 30b has two limbs 34 arranged lying opposite each other in the longitudinal direction x. A fastening limb 36 running substantially horizontally protrudes in each case from the two limbs 34. The gear holder 30b is connectable, in particular screwable, to the second rail 4 with the two fastening limbs 36. The two limbs 34 of the gear holder 30b are connected to each other by a base 32 running substantially horizontally.

The base 32 has precisely one recess 38. The recess 38 extends substantially over the entire extent of the base 32 between the two limbs 34. The recess 38 is delimited parallel to the longitudinal direction x by the limbs 34. The base 32 is divided in the present case into two bridge portions 33 running in parallel, in particular bridge portions 33 oriented parallel to the longitudinal direction x. The recess 38 is delimited in the transverse direction y by the two bridge portions 33 of the base 32.

The base 32, in particular the bridge portions 33 of the base 32, has a bevel 42 on its lateral outer edges, as viewed in the longitudinal direction x. The gear holder 30b can have a reduced thickness in the region of the base 32.

The gear holder 30b can be manufactured as a punched and bent part from a metal sheet, in particular a steel sheet. The two limbs 34 are thus bent at the two ends upward by approximately 90° in relation to the base 32. The two fastening limbs 36 are bent over away from each other by approximately 90° at the ends of the limbs 34 in each case lying opposite the base 32. In the region of the recesses 38, the limbs 34 each have a portion 44 which is punched free and, during the introduction of the bend between base 32 and the respective limb 34, is not bent, but rather maintains its rectilinear profile relative to the limb 34. After the bend of the limb 34, the portion 44 has a vertical profile. Accordingly, the portion 44 is not bent, but rather merely pivoted by approx. 90°.

The gear housing 18 can have a cutout in a central region. The gear housing 18 can enter into the recesses 38 of the base 32. In the vertical direction z above the outer regions of the base 32 in the transverse direction y, a gap 46 which serves for tolerance compensation can be provided between the base 32 and the gear housing 18 or between the base 32 and the buffers 20.

Figure 11:
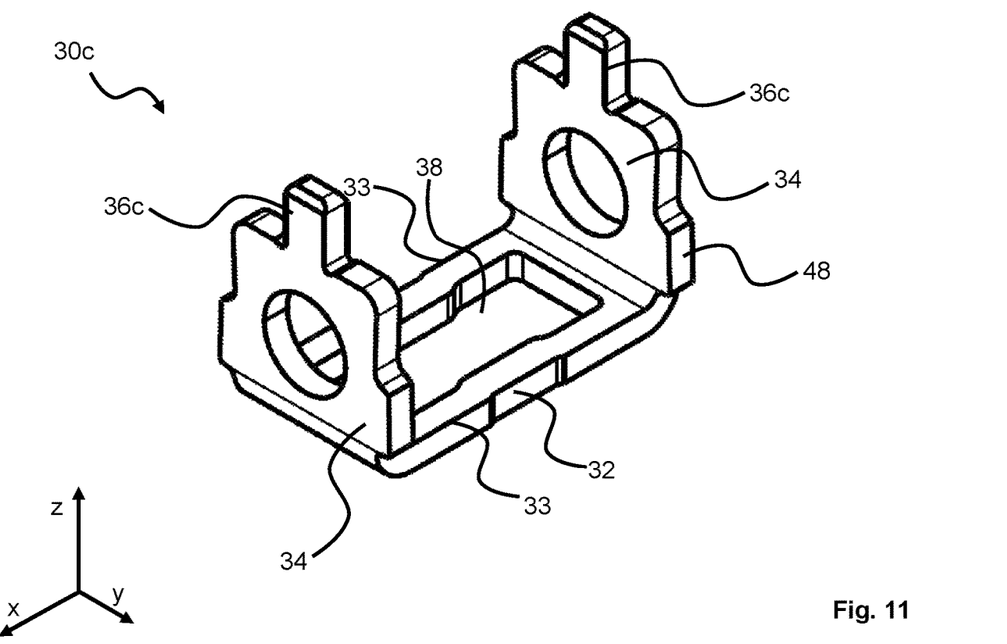
FIG. 11 shows a perspective illustration of a gear holder according to a third exemplary embodiment of a longitudinal adjuster according to the invention.
Figure 12:
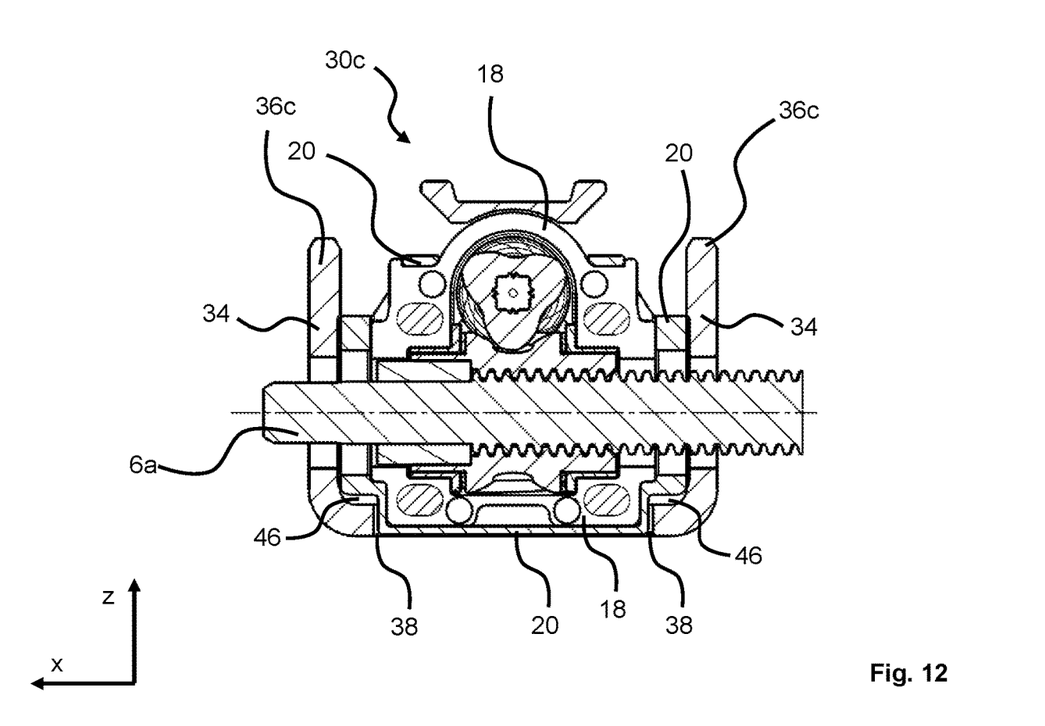
FIG. 12 shows a sectional illustration through the gear holder with gear and spindle according to the third exemplary embodiment of the longitudinal adjuster according to the invention.

FIGS. 11 and 12 show various illustrations of a gear holder 30c of a longitudinal adjuster 1 according to the invention according to a third exemplary embodiment. The gear holder 30c of the longitudinal adjuster 1 according to the invention according to the third exemplary embodiment substantially corresponds to the gear holder 30b, shown in FIGS. 8 to 10, according to the second exemplary embodiment, unless described differently below.

The gear holder 30c is of substantially U-shaped configuration. The gear holder 30c has two limbs 34 arranged opposite each other in the longitudinal direction x. A fastening portion 36c protruding substantially vertically protrudes in each case from the two limbs 34. The gear holder 30c is connectable, in particular rivetable, to the second rail 4 with the two fastening portions 36c. For the fastening of the gear holder 30c to the second rail 4, the fastening portions 36c can be passed through cooperating openings in the second rail 4 and can be riveted by the deformation on a side of the second rail 4 lying opposite the gear housing 18. The two limbs 34 of the gear holder 30c have lateral projections 48 which can be received in corresponding recesses in vertically running wall portions of the second rail 4. The two limbs 34 of the gear holder 30c are connected to each other by a substantially horizontally running base 32. The two limbs 34 are bent over by approx. 90° over their entire width relative to the base 32.

The base 32 has precisely one recess 38. The recess 38 is delimited parallel to the longitudinal direction x. The base 32 has two bridge portions 33 running in parallel, in particular bridge portions 33 oriented parallel to the longitudinal direction x. The recess 38 is delimited in the transverse direction y by the two bridge portions 33 of the base 32.

The base 32, in particular the bridge portions 33 of the base 32, can have a bevel 42 at its/their lateral outer edges, as viewed in the longitudinal direction x. The gear holder 30c can have a reduced thickness in the region of the base 32. The gear holder 30c can be manufactured as a punched and bent part from a metal sheet, in particular a steel sheet. The two limbs 34 are thus bent upward at the two ends by approximately 90° in relation to the base 32.

The gear housing 18 can have a recess in a central region. The gear housing 18 can enter into the recesses 38 of the base 32. In the vertical direction z above the outer regions of the base 32, a gap 46 which serves for tolerance compensation can be provided between the base 32 and the gear housing 18 or between the base 32 and the buffers 20.

FIG. 12 shows the gear holder 30c with the gear 10 and a spindle 6a according to the third exemplary embodiment of the longitudinal adjuster 1 according to the invention in the second variant with a rotatably driven spindle 6a. However, the gear holder 30c which is shown is expressly also usable in a longitudinal adjuster 1 of the first variant with a fixed spindle.

The features disclosed in the description above, in the claims, and in the drawings may be of importance, both individually and in combination, for the implementation of the invention in its various configurations.

Although the invention has been described in detail in the drawings and in the above illustration, the illustrations should be understood as being illustrative and by way of example and not as restrictive. In particular, the selection of the graphically illustrated proportions of the individual elements should not be interpreted as being required or limiting. Furthermore, the invention is in particular not limited to the exemplary embodiments discussed. Further variants of the invention and the implementation thereof are apparent to a person skilled in the art from the preceding disclosure, from the figures and from the claims.

Terms such as "comprise", "have", "include", "contain" and the like used in the claims do not rule out further elements or steps. The use of the indefinite article does not rule out a plurality. A single device may perform the functions of several of the units or devices mentioned in the claims.

LIST OF REFERENCE SIGNS 1 longitudinal adjuster
2 first rail
4 second rail
6 spindle
6a spindle
8 spindle holder
10 gear
12 worm
14 spindle nut
16 bearing bushing
18 gear housing
18a housing part
18b housing part
20 buffer
30 gear holder
30a gear holder
30b gear holder
30c gear holder
32 base
33 bridge portion
34 limb
36 fastening limb
36c fastening portion
38 recess
40 web
42 bevel
44 portion
46 gap
48 projection
100 vehicle seat
102 seat part
104 backrest
x longitudinal direction
y transverse direction
z vertical direction

What is claimed is:

1. A longitudinal adjuster for a motor vehicle seat, having a first rail, a second rail which is guided displaceably in a longitudinal direction in the first rail, a spindle which is arranged between the first rail and the second rail, and a gear, wherein the gear is in engagement with a thread of the spindle and is movable along the spindle, or the gear is arranged in a fixed position relative to the spindle and the spindle is drivable by the gear, wherein the gear is fastened to the second rail by a substantially U-shaped gear holder, wherein the gear holder has at least two limbs which are arranged opposite one another in the longitudinal direction, wherein the gear holder has at least one recess in a base connecting the two limbs and running horizontally, wherein the at least one recess is a through-hole extending from an inner surface of the base to an outer surface of the base, wherein a gear housing surrounding the gear projects at least in sections into the at least one recess.

2. The longitudinal adjuster as claimed in claim 1, wherein at least one buffer is plugged onto a gear housing of the gear.

3. The longitudinal adjuster as claimed in claim 2, wherein the at least one buffer projects in sections into the at least one recess.

4. The longitudinal adjuster as claimed in claim 2, wherein two buffers are plugged onto the gear housing parallel to the axial direction of the spindle, wherein in each case one buffer projects in sections into in each case one recess.

5. The longitudinal adjuster as claimed in claim 1, wherein the gear holder has two recesses in the base.

6. The longitudinal adjuster as claimed in claim 5, wherein the two recesses are separated from each other by a web.

7. The longitudinal adjuster as claimed in claim 6, wherein the web runs inclined at a right angle with respect to an axis of rotation of the spindle.

8. The longitudinal adjuster as claimed in claim 1, wherein the limbs each have a portion in the region of the at least one recess.

9. The longitudinal adjuster as claimed in claim 8, wherein the portions are punched free.

10. The longitudinal adjuster as claimed in claim 9, wherein the portions have a rectilinear profile relative to the respective limb.

11. The longitudinal adjuster as claimed in claim 10, wherein the portions are at an angle of 90° relative to the base.

12. The longitudinal adjuster as claimed in claim 1, wherein the gear holder has precisely one recess in the base and the base is divided by the recess into two bridge portions running in parallel.

13. The longitudinal adjuster as claimed in claim 12, wherein the recess is delimited in the transverse direction by the two bridge portions of the base.

14. The longitudinal adjuster as claimed in claim 13, wherein the bridge portions of the base each has/have a bevel on its/their lateral outer edges, as viewed in the longitudinal direction.

15. A motor vehicle seat, wherein the vehicle seat has a longitudinal adjuster as claimed in claim 1 for adjusting a seat longitudinal position.

* * * * *